US008767757B1

(12) United States Patent
Chudgar et al.

(10) Patent No.: US 8,767,757 B1
(45) Date of Patent: Jul. 1, 2014

(54) PACKET FORWARDING SYSTEM AND METHOD USING PATRICIA TRIE CONFIGURED HARDWARE

(75) Inventors: Keyur Chudgar, San Jose, CA (US); Satish Sathe, San Ramon, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 128 days.

(21) Appl. No.: 13/396,711

(22) Filed: Feb. 15, 2012

(51) Int. Cl.
*H04L 12/28* (2006.01)
(52) U.S. Cl.
USPC ........................................ 370/408; 370/256
(58) Field of Classification Search
USPC .......... 370/225, 245, 256, 390, 392, 408, 496
See application file for complete search history.

(56) References Cited

U.S. PATENT DOCUMENTS

| | | | |
|---|---|---|---|
| 5,781,799 A * | 7/1998 | Leger et al. ..................... 710/22 |
| 6,839,346 B1 | 1/2005 | Kametani | |
| 6,985,483 B2 | 1/2006 | Mehrotra et al. | |
| 7,003,118 B1 | 2/2006 | Yang et al. | |
| 7,039,018 B2 | 5/2006 | Singh et al. | |
| 7,058,725 B2 | 6/2006 | Mathew et al. | |
| 7,277,885 B2 | 10/2007 | Eppley et al. | |
| 7,310,685 B2 | 12/2007 | Basso et al. | |
| 7,720,100 B2 | 5/2010 | Sgouros et al. | |
| 7,788,406 B2 | 8/2010 | Basso et al. | |
| 7,889,712 B2 * | 2/2011 | Talur et al. .................... 370/351 |
| 8,050,257 B2 * | 11/2011 | Beshai ......................... 370/387 |
| 8,331,404 B2 * | 12/2012 | Law et al. ..................... 370/497 |
| 2003/0152092 A1 | 8/2003 | Lu | |
| 2004/0177150 A1 | 9/2004 | Kogan | |
| 2006/0002292 A1 * | 1/2006 | Chang et al. ................. 370/225 |
| 2006/0168265 A1 * | 7/2006 | Bare et al. .................... 709/230 |
| 2006/0287742 A1 * | 12/2006 | Khan et al. ...................... 700/90 |
| 2007/0204073 A1 * | 8/2007 | Chen et al. .................... 710/22 |
| 2007/0208887 A1 * | 9/2007 | Kim et al. ...................... 710/22 |
| 2009/0161694 A1 * | 6/2009 | Amagai et al. ............... 370/469 |
| 2009/0201808 A1 * | 8/2009 | Bettink et al. ................ 370/230 |
| 2013/0070766 A1 * | 3/2013 | Pudiyapura ................... 370/390 |

OTHER PUBLICATIONS

Moon, Daeyeong, Bridging this Software/Hardware Fowarding Divide; www.cs.berkeley.edu/~istoca/classes/cs268/papers/paper-27.pdf; Not Dated: 15 pages. Berkeley.
Pao, Derek; Efficient Hardware Architecture for Fast IP Address Lookup; IEEE Infocom 2002; Jun. 2002; pp. 555-561; 0-7803-7476-2/02/$17; IEEE, USA.
Seppanen, Kari, Novel IP Addres Lookup Algorithm for Inexpensive Hardware Implemantation; http://www.vit.fi/lte/; Not Dated; Technical Research Centre of Finland(VTT); Finland.

* cited by examiner

*Primary Examiner* — Hassan Phillips
*Assistant Examiner* — Ajay Cattungal
(74) *Attorney, Agent, or Firm* — Amin, Turocy & Watson, LLP

(57) ABSTRACT

A method is provided for forwarding packets. Using a control plane state machine, addresses in a packet header are examined to derive a pointer value. The pointer value is used to access entries in a result database to identify routing information, a buffer pool ID associated with a location in memory, and a queue ID. A direct memory access (DMA) engine writes the packet into the memory location in response to the first message including the buffer pool ID. The QM prepares a second message associated with the packet, the second message including the routing information, the memory allocation in the buffer pool ID, and the queue ID. An operating system reads the second message, reads the packet from the memory allocation, modifies the packet header using the routing information, and writes the modified packet back into the memory allocation.

22 Claims, 8 Drawing Sheets

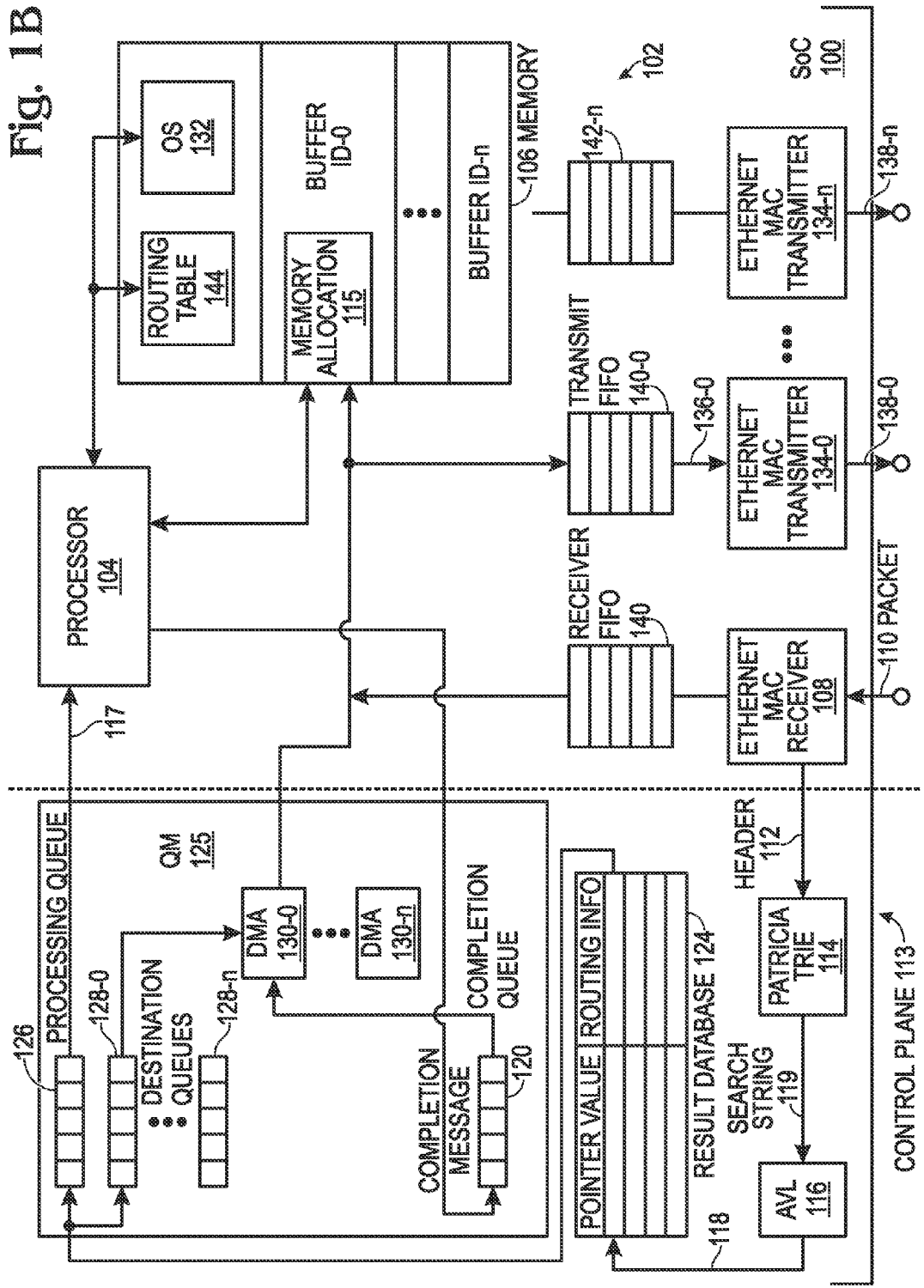

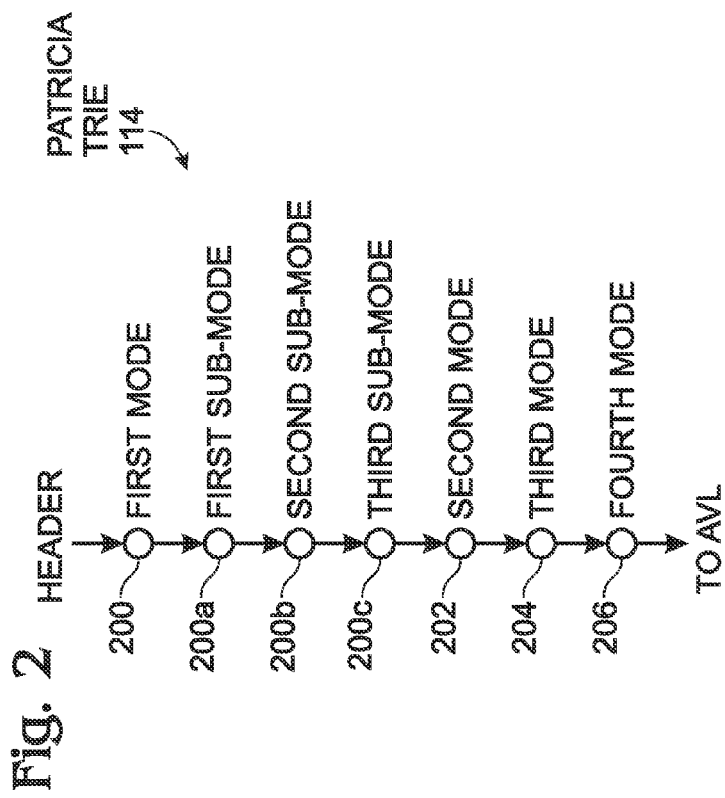

Fig. 3

| bit OFFSET | L2 (ETHERNET) HEADER 0-13 | | | | | |
|---|---|---|---|---|---|---|
| | 0-3 | 4-7 | 8-13 | 14-15 | 16-18 | 19-31 |
| 0 | VERSION | HEADER LENGTH | DIFFERENTIATED SERVICES CODE POINT | EXPLICIT CONGESTION NOTIFICATION | TOTAL LENGTH | |
| 32 | IDENTIFICATION | | | | FLAGS | FRAGMENT OFFSET |
| 64 | TIME TO LIVE | | PROTOCOL | | HEADER CHECKSUM | |
| 96 | SOURCE IP ADDRESS | | | | | |
| 128 | DESTINATION IP ADDRESS | | | | | |
| 160 | OPTIONS (IF HEADER LENGTH > 5) | | | | | |
| 160 OR 192+ | DATA | | | | | |

Fig. 4

| Node Index/Type | EW Branch0 or FW0 Branch0 | EW Branch1 or FW0 Branch1 | EW Branch2 or FW0 Branch2 | EW Branch3 or FW0 Branch3 | EW Branch4 or FW1 Branch0 | EW Branch5 or FW1 Branch1 | EW Branch6 or FW1 Branch2 | EW Branch7 or FW1 Branch3 |
|---|---|---|---|---|---|---|---|---|
| 0/EWDN | If Byte[0,1] EQ MAC[0,1] Jump(Node0 (EW), Branch1) | If Byte[2,3] EQ MAC[2,3] Jump(Node0 (EW), Branch2) | If Byte[4,5] EQ MAC[4,5] Jump(Node0 (EW), Branch3) | If Byte[12,13] EQ 0x0800 (IPv4) Jump(Node0 (EW), Branch4) | If Byte[14] EQ 0x45(IPv4 HL) Jump(Node0 (EW), Branch5) | If Byte[22] GTEQ 2(TTL) Jump(Node1 (FW0), Branch0) | | |
| 1/FWDN | If Byte[26,27] EQ ANY(SRC IP[0,1]) Store Search String[0,1] (e.g. 192.168) Jump(Node1 (FW0), Branch1) | If Byte[28,29] EQ ANY(SRC IP[2,3]) Store Search String[2,3] (e.g. 10.100) Jump(Node1 (FW0), Branch2) | If Byte[30,31] EQ ANY(DST IP[0,1]) Store Search String[4,5] (e.g. 172.125) Jump(Node1 (FW0), Branch2) | If Byte[32,33] EQ ANY(DST IP[2,3]) Store Search String[6,7] (e.g. 13.200) Jump(Node1 (FW1), Branch0) | If Search String[0,7] Jump(AVL Tree for Matching Search String). If AVL Tree has match Jump to its result pointer | | | |
| 2/KN | Priority 1, Result Pointer 1 | | | | | | | |

Fig. 5

| NODE INDEX | SEARCH STRING | PRIORITY | RESULT POINTER |
|---|---|---|---|
| 0 | 192.168.10.100 172.125.13.200 | 0 | 2 |
| 1 | 192.168.10.101 172.125.13.200 | 0 | 2 |
| 2 | 192.168.10.101 172.200.14.300 | 0 | 3 |

Fig. 6

| POINTER | SIGNATURE | DST PORT | DST MAC ADDRESS |
|---|---|---|---|
| 0 | 0 | 0 | 0 |
| 1 | 0 | 0 | 2 |
| 2 | 0xCC | 0 | 00:23:45:15:16:10 |
| 3 | 0xCC | 1 | 00:45:12:67:12:60 |

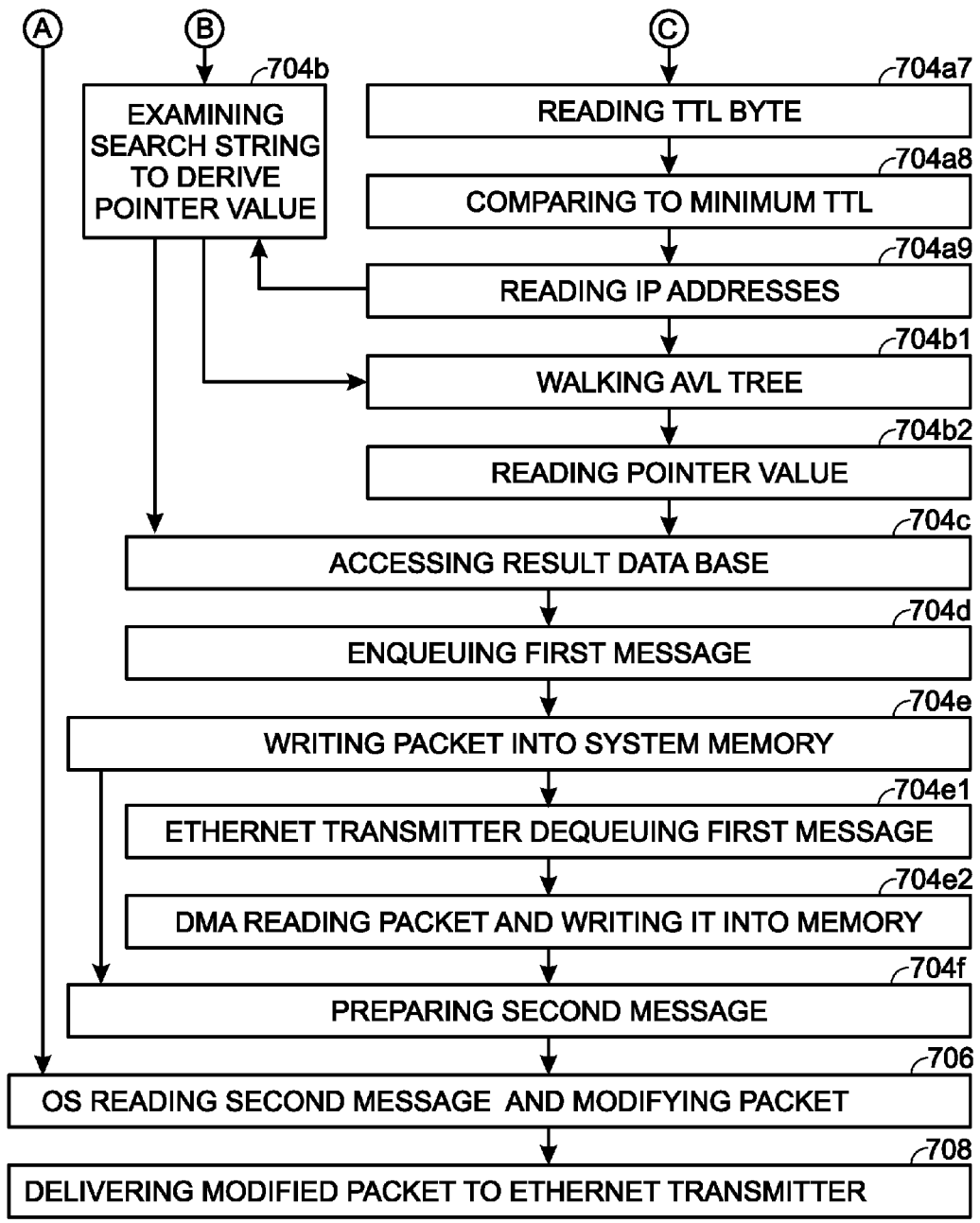

PACKET FORWARDING SYSTEM AND METHOD USING PATRICIA TRIE CONFIGURED HARDWARE

BACKGROUND OF THE INVENTION

1. Field of the Invention

This invention generally relates to the processing of network communications and, more particularly, to a system and method for using hardware circuitry to perform Ethernet packet forwarding functions.

2. Description of the Related Art

As noted in Wikipedia, in packet routing, the control plane is the part of the router architecture that is concerned with drawing the network map, or the information in a (possibly augmented) routing table that defines what to do with incoming packets. Control plane functions, such as participating in routing protocols, run in the architectural control element. In most cases, the routing table contains a list of destination addresses and the outgoing interface(s) associated with them. Control plane logic also can define certain packets to be discarded, as well as preferential treatment of certain packets for which a high quality of service is defined by such mechanisms as differentiated services.

Depending on the specific router implementation, there may be a separate forwarding information base that is populated (i.e., loaded) by the control plane, but used by the forwarding plane to look up packets, at very high speed, and decide how to handle them.

A major function of the control plane is deciding which routes go into the main routing table. "Main" refers to the table that holds the unicast routes that are active. Multicast routing may require an additional routing table for multicast routes. Several routing protocols e.g. open-shortest-path-first (OSPF) and border gateway protocol (BGP) maintain internal data bases of candidate routes which are promoted when a route fails or when a routing policy is changed.

Several different information sources may provide information about a route to a given destination, but the router must select the "best" route to install into the routing table. In some cases, there may be multiple routes of equal "quality", and the router may install all of them and load-share across them.

There are three general sources of routing information: Information on the status of directly connected hardware and software-defined interfaces; manually configured static routes; and, information from (dynamic) routing protocols.

Routers forward traffic that enters on an input interface and leaves on an output interface, subject to filtering and other local rules. While routers usually forward from one physical (e.g., Ethernet, serial) to another physical interface, it is also possible to define multiple logical interfaces on a physical interface. A physical Ethernet interface, for example, can have logical interfaces in several virtual Local Area Networks (LANs) defined by IEEE 802.1Q VLAN headers.

When an interface has an address configured in a subnet, such as 192.0.2.1 in the 192.0.2.0/24 (i.e., subnet mask 255.255.255.0) subnet, and that interface is considered "up" by the router, the router thus has a directly connected route to 192.0.2.0/24. If a routing protocol offered another router's route to that same subnet, the routing table installation software will normally ignore the dynamic route and prefer the directly connected route.

There also may be software-only interfaces on the router, which it treats as if they were locally connected. For example, most implementations have a "null" software-defined interface. Packets having this interface as a next hop will be discarded, which can be a very efficient way to filter traffic. Routers usually can route traffic faster than they can examine it and compare it to filters, so, if the criterion for discarding is the packet's destination address, "blackholing" the traffic will be more efficient than explicit filters.

Other software defined interfaces that are treated as directly connected, as long as they are active, are interfaces associated with tunneling protocols such as generic routing encapsulation (GRE) or Multi-Protocol Label Switching (MPLS).

Router configuration rules may contain static routes. A static route minimally has a destination address, a prefix length or subnet mask, and a definition where to send packets for the route. That definition can refer to a local interface on the router, or a next-hop address that could be on the far end of a subnet to which the router is connected. The next-hop address could also be on a subnet that is directly connected, and, before the router can determine if the static route is usable, it must do a recursive lookup of the next hop address in the local routing table. If the next-hop address is reachable, the static route is usable, but if the next-hop is unreachable, the route is ignored.

Static routes also may have preference factors used to select the best static route to the same destination. One application is called a floating static route, where the static route is less preferred than a route from any routing protocol. The static route, which might use a dialup link or other slow medium, activates only when the dynamic routing protocol(s) cannot provide a route to the destination.

Static routes that are more preferred than any dynamic route also can be very useful, especially when using traffic engineering principles to make certain traffic go over a specific path with an engineered quality of service.

See forwarding plane explanation below for more detail, but each implementation has its own means of updating the forwarding information base (FIB) with new routes installed in the routing table. If the FIB is in one-to-one correspondence with the routing information base (RIB), the new route is installed in the FIB after it is in the RIB. If the FIB is smaller than the RIB, and the FIB uses a hash table or other data structure that does not easily update, the existing FIB might be invalidated and replaced with a new one computed from the updated RIB.

In routing, the forwarding plane, sometimes called the data plane, defines the part of the router architecture that decides what to do with packets arriving on an inbound interface. Most commonly, it refers to a table in which the router looks up the destination address of the incoming packet and retrieves the information necessary to determine the path from the receiving element, through the internal forwarding fabric of the router, and to the proper outgoing interface(s). The IP Multimedia Subsystem architecture uses the term transport plane to describe a function roughly equivalent to the routing control plane.

The table also might specify that the packet is discarded. In some cases, the router will return an Internet Control Message Protocol (ICMP) "destination unreachable" or other appropriate code. Some security policies, however, dictate that the router should be programmed to drop the packet silently. By dropping filtered packets silently, a potential attacker does not become aware of a target that is being protected.

The incoming forwarding element will also decrement the time-to-live (TTL) field of the packet, and, if the new value is zero, discard the packet. While the Internet Protocol (IP) specification indicates that an Internet Control Message Protocol (ICMP) "TTL exceeded" message should be sent to the originator of the packet i.e., the node with the source address in the packet), routers may be programmed to drop the packet silently.

Depending on the specific router implementation, the table in which the destination address is looked up could be the routing table (also known as the routing information base, or a separate forwarding information base that is populated (i.e., loaded) by the routing control plane, but used by the forwarding plane to look up packets, at very high speed, and decide how to handle them. Before or after examining the destination, other tables may be consulted to make decisions to drop the packet based on other characteristics, such as the source address, the IP protocol identifier field, or Transmission Control Protocol (TCP) or User Datagram Protocol (UDP) port number.

Forwarding plane functions run in the forwarding element. High-performance routers often have multiple distributed forwarding elements, so that the router increases performance with parallel processing.

The outgoing interface will encapsulate the packet in the appropriate data link protocol. Depending on the router software and its configuration, functions, usually implemented at the outgoing interface, may set various packet fields, such as the DSCP field used by differentiated services.

In general, the passage from the input interface directly to an output interface, through the fabric with minimum modification at the output interface, is called the fast path of the router. If the packet needs significant processing, such as segmentation or encryption, it may go onto a slower path, which is sometimes called the services plane of the router. Service planes can make forwarding or processing decisions based on higher-layer information, such as a Web URL contained in the packet payload.

Vendors design router products for specific markets. Design of routers intended for home use, perhaps supporting several PCs and VoIP telephony, is driven by keeping the cost as low as possible. In such a router, there is no separate forwarding fabric, and there is only one active forwarding path: into the main processor and out of the main processor.

Routers for more demanding applications accept greater cost and complexity to get higher throughput in their forwarding planes. Several design factors affect router forwarding performance:

Data link layer processing and extracting the packet
  Decoding the packet header
Looking up the destination address in the packet header
Analyzing other fields in the packet
Sending the packet through the "fabric" interconnecting
  the ingress and egress interfaces
Processing and data link encapsulation at the egress interface Routers may have one or more processors. In a uniprocessor design, these performance parameters are affected not just by the processor speed, but by competition for the processor. Higher-performance routers invariably have multiple processing elements, which may be general-purpose processor chips or specialized application-specific integrated circuits (ASIC).

Very high performance products have multiple processing elements on each interface card. In such designs, the main, processor does not participate in forwarding, but only in control plane and management processing.

In the Internet Engineering Task Force, two working groups in the Operations & Maintenance Area deal with aspects of performance. The Interprovider Performance Measurement (IPPM) group focuses, as its name would suggest, on operational measurement of services. Performance measurements on single routers, or narrowly defined systems of routers, are the province of the Benchmarking Working Group (BMWG).

RFC 2544 is the key BMWG document. A classic RFC 2544 benchmark uses half the router's (i.e., the device under test (DUT)) ports for input of a defined load, and measures the time at which the outputs appear at the output ports.

Originally, all destinations were looked up in the RIB. Perhaps the first step in speeding routers was to have a separate RIB and FIB in main memory, with the FIB, typically with fewer entries than the RIB, being organized for fast destination lookup. In contrast, the RIB was optimized for efficient updating by routing protocols.

Early uniprocessing routers usually organized the FIB as a hash table, while the RIB might be a linked list. Depending on the implementation, the FIB might have fewer entries than the RIB, or the same number.

When routers started to have separate forwarding processors, these processors usually had far less memory than the main processor, such that the forwarding processor could hold only the most frequently used routes. On the early Cisco AGS+ and 7000, for example, the forwarding processor cache could hold approximately 1000 route entries. In an enterprise, this would often work quite well, because there were fewer than 1000 server or other popular destination subnets. Such a cache, however, was far too small for general Internet routing. Different router designs behaved in different ways when a destination was not in the cache.

A cache miss condition might result in the packet being sent back to the main processor, to be looked up in a slow path that had access to the full routing table. Depending on the router design, a cache miss might cause an update to the fast hardware cache or the fast cache in main memory. In some designs, it was most efficient to invalidate the fast cache for a cache miss, send the packet that caused the cache miss through the main processor, and then repopulate the cache with a new table that included the destination that caused the miss. This approach is similar to an operating system with virtual memory, which keeps the most recently used information in physical memory.

As memory costs went down and performance needs went up, FIBs emerged that had the same number of route entries as in the RIB, but arranged for fast lookup rather than fast update. Whenever a RIB entry changed, the router changed the corresponding FIB entry.

High-performance FIBs achieve their speed with implementation-specific combinations of specialized algorithms and hardware. Various search algorithms have been used for FIB lookup. While well-known general-purpose data structures were first used, such as hash tables, specialized algorithms, optimized for IP addresses, emerged. They include:
  Binary tree
  Radix tree
  Four-way trie
  Patricia tree [3]

A multicore CPU architecture is commonly used to implement high-performance networking systems. These platforms facilitate the use of a software architecture in which the high-performance packet processing is performed within a fast path environment on dedicated cores, in order to maximize system throughput. A run-to-completion model minimizes OS overhead and latency.

Various forms of fast RAM and, eventually, basic content addressable memory (CAM) were used to speed lookup. CAM, while useful in layer 2 switches that needed to look up a relatively small number of fixed-length MAC addresses, had limited utility with IP addresses having variable-length routing prefixes (see Classless Inter-Domain Routing). Ternary CAM (CAM), while expensive, lends itself to variable-length prefix lookups.

One of the challenges of forwarder lookup design is to minimize the amount of specialized memory needed, and, increasingly, to minimize the power consumed by memory.

A next step in speeding routers was to have a specialized forwarding processor separate from the main processor. There was still a single path, but forwarding no longer had to compete with control in a single processor. The fast routing processor typically had a small FIB, with hardware memory (e.g., static random access memory (SRAM)) faster and more expensive than the FIB in main memory. Main memory was generally dynamic random access memory (DRAM).

Next, routers began to have multiple forwarding elements that communicated through a high-speed shared bus or through a shared memory. Eventually, the shared resource became a bottleneck, with the limit of shared bus speed being roughly 2 million packets per second (Mpps). Crossbar fabrics broke through this bottleneck.

As forwarding bandwidth increased, even with the elimination of cache miss overhead, the shared paths limited throughput. While a router might have 16 forwarding engines, if there was a single bus, only one packet transfer at a time was possible. There were some special cases where a forwarding engine might find that the output interface was one of the logical or physical interfaces present on the forwarder card, such that the packet flow was totally inside the forwarder. It was often easier, however, even in this special case, to send the packet out the bus and receive it from the bus.

While some designs experimented with multiple shared buses, the eventual approach was to adapt the crossbar switch model from telephone switches, in which every forwarding engine had a hardware path to every other forwarding engine. With a small number of forwarding engines, crossbar forwarding fabrics are practical and efficient for high-performance routing. There are multistage designs for crossbar systems, such as Clos networks.

A radix or Patricia (Practical Algorithm To Retrieve Information Coded in Alphanumeric) trie is a space-optimized data structure where each node with only one child is merged with its child. The result is that every internal node has at least two children. Unlike in regular tries, edges can be labeled with sequences of characters as well as single characters. This makes them much more efficient for small sets (especially if the strings are long) and for sets of strings that share long prefixes.

It supports the following main Operations, all of which are O(k), where k is the maximum length of all strings in the set:

Lookup: Determines if a string is in the set. This operation is identical to tries except that some edges consume multiple characters;

Insert: Add a string to the trie. The trie is searched until no further progress can be made. At this point either a new outgoing edge is added, labeled with all remaining characters in the input string, or if there is already an outgoing edge sharing a prefix with the remaining input string, it is split into two edges (the first labeled with the common prefix) and proceed. This splitting step ensures that no node has more children than there are possible string characters;

Delete: Delete a string from the trie. First, the corresponding leaf is deleted. Then, if its parent only has one child remaining, the parent is deleted and the two incident edges are merged;

Find predecessor: Locates the largest string less than a given string, by lexicographic order;

Find successor: Locates the smallest string greater than a given string, by lexicographic order.

Radix trees are useful for constructing associative arrays with keys that can be expressed as strings. They find particular application in the area of IP routing, where the ability to contain large ranges of values with a few exceptions is particularly suited to the hierarchical organization of IP addresses. They are also used for inverted indexes of text documents in information retrieval.

In computer science, an AVL (Adelson-Velskii and Landis) tree is a self-balancing binary search tree. In an AVL tree, the heights of the two child subtrees of any node differ by at most one. Lookup, insertion, and deletion all take O(log n) time in both the average and worst cases, where n is the number of nodes in the tree prior to the operation. Insertions and deletions may require the tree to be rebalanced by one or more tree rotations.

The balance factor of a node is the height of its left subtree minus the height of its right subtree (sometimes opposite) and a node with balance factor 1, 0, or −1 is considered balanced. A node with any other balance factor is considered unbalanced and requires rebalancing the tree. The balance factor is either stored directly at each node or computed from the heights of the subtrees.

Basic operations of an AVL tree involve carrying out the same actions as would be carried out on an unbalanced binary search tree, but modifications are preceded or followed by one or more operations called tree rotations, which help to restore the height balance of the subtrees.

Routing is the process of selecting paths in a network along which to send network traffic. Routing is performed for many kinds of networks, including the telephone network (Circuit switching), electronic data networks (such as the Internet), and transportation networks. In packet switching networks, routing directs packet forwarding, the transit of logically addressed packets from their source toward their ultimate destination through intermediate nodes, typically hardware devices called routers, bridges, gateways, firewalls, or switches. General-purpose computers can also forward packets and perform routing, though they are not specialized hardware and may suffer from limited performance. The routing process usually directs forwarding on the basis of routing tables which maintain a record of the routes to various network destinations. Thus, constructing routing tables, which are held in the router's memory, is very important for efficient routing. Most routing algorithms use only one network path at a time, but multipath routing techniques enable the use of multiple alternative paths.

A routing table, or Routing information Base (RIB), is a data table stored in a router or a networked computer that lists the routes to particular network destinations, and in some cases, metrics (distances) associated with those routes. The routing table contains information about the topology of the network immediately around it. The construction of routing tables is the primary goal of routing protocols. Static routes are entries made in a routing table by non-automatic means and which are fixed rather than being the result of some network topology 'discovery' procedure.

A routing table utilizes the same idea that one does when using a map in package delivery. Whenever a node needs to send data to another node on a network, it must know where to send it, first. If the node cannot directly connect to the destination node, it has to send it via other nodes along a proper route to the destination node. Most nodes do not try to figure out which route(s) might work; instead, a node will send an IP packet to a gateway in the LAN, which then decides how to route the "package" of data to the correct destination. Each gateway needs to keep track of which way to deliver various packages of data, and for this it uses a routing table. A routing table is a database which keeps track of paths, like a map, and allows the gateway to provide this information to the node requesting the information.

The routing table consists of at least three information fields:

1. the network id: i.e. the destination network id.
2. cost: i.e. the cost or metric of the path through which the packet is to be sent.
3. next hop: The next hop, or gateway, is the address of the next station to which the packet is to be sent on the way to its final destination.

Depending on the application and implementation, it can also contain additional values that refine path selection:

1. quality of service associated with the route. For example, the U flag indicates that an IP route is up.
2. links to filtering criteria/access lists associated with the route.
3. interface: such as eth0 for the first Ethernet card, eth1 for the second Ethernet card, etc.

Shown below is an example of what the table above could look like on an average computer connected to the Internet via a home router:

| Network Destination | Netmask | Gateway | Interface | Metric |
|---|---|---|---|---|
| 0.0.0.0 | 0.0.0.0 | 192.168.0.1 | 192.168.0.100 | 10 |
| 127.0.0.0 | 255.0.0.0 | 127.0.0.1 | 127.0.0.1 | 1 |
| 192.168.0.0 | 255.255.255.0 | 192.168.0.100 | 192.168.0.100 | 10 |
| 192.168.0.100 | 255.255.255.255 | 127.0.0.1 | 127.0.0.1 | 10 |
| 192.168.0.255 | 255.255.255.255 | 192.168.0.100 | 192.168.0.100 | 10 |

The columns Network Destination and Netmask together describe the Network id as mentioned earlier. For example, destination 192.168.0.0 and netmask 255.255.255.0 can be written as network id 192.168.0.0/24. The Gateway column contains the same information as the Next hop, i.e., it points to the gateway through which the network can be reached. The interface indicates what locally available interface is responsible for reaching the gateway. In this example, gateway 192.168.0.1 (the Internet router) can be reached through the local network card with address 192.168.0.100.

Finally, the Metric indicates the associated cost of using the indicated route. This is useful for determining the efficiency of a certain route from two points in a network. In this example, it is more efficient to communicate with the computer itself through the use of address 127.0.0.1 (called "localhost") than it would be through 192.168.0.100 (the IP address of the local network card).

Routing tables are generally not used directly for packet forwarding in modern router architectures; instead, they are used to generate the information for a smaller forwarding table. A forwarding table contains only the routes which are chosen by the routing algorithm as preferred routes for packet forwarding. It is often in a compressed or pre-compiled format that is optimized for hardware storage and lookup.

Internet Protocol version 4 (IPv4) is the fourth revision in the development of the Internet Protocol (IP) and the first version of the protocol to be widely deployed. IPv4 is a connectionless protocol for use on packet-switched Link Layer networks (e.g., Ethernet). It operates on a best effort delivery model, in that it does not guarantee delivery, nor does it assure proper sequencing or avoidance of duplicate delivery. These aspects, including data integrity, are addressed by an upper layer transport protocol such as the Transmission Control Protocol (TCP).

One current problem is the achievement of high data rates in IPv4 packet forwarding in medium scale (Enterprise level routers), where the entire IPv4 packet forwarding is performed by a processor enabled using Ethernet driver packet forwarding software, such as might be found in a Linux operating system (OS). The acceleration of IPv4 forwarding can be done using dedicated network processors, but it adds too much system cost and complexity, which is not acceptable in medium scale routers.

In IPv4 packet processing, there are two major operations involved: routing and forwarding. The entire IPv4 packet forwarding task can be divided into three subtasks: Input processing; Forwarding; and, Output processing.

Input processing: In this task, memory is allocated for the packet and the packet is received in the system. Then the packet is examined for its validity. If the packet is not valid, it is dropped, packet memory is freed, and statistics are updated.

Forwarding: In this task, the packet's header is used for lookup into the routing table. If the packet is sinking (terminating in the system), it is simply delivered to higher level for further packet processing. But if the packet is not sinking in the system, then the routing table is used for lookup. If the valid route is found, the packet is prepared for output processing with the appropriate interface information. If the route is not found, the packet is dropped, packet memory is freed, and an Internet Control Message Protocol (ICMP) route not found packet is sent to the source.

Output processing: In this task, some packet modifications are done. For example, appropriate MAC addresses in L2 header are modified. In the case of IPv4, the header is modified by computing a new time to live (TTL). Then, the packet is sent out on appropriate interface. After the packet is sent out of the physical interface, packet memory is de-allocated.

The routing is the control path, while the forwarding is the data path. As noted above, routing is used to create routes between nodes in the system. There are numerous algorithms available and implemented in software for routing, including but not limited to border gateway protocol (BOP) and open-shortest-path-first (OSPF), to name a few. The routes can also be created statically and permanently using 'route' utility in Ethernet driver software. The majority of routing tasks are done in software, even in today's systems. Operating systems like Linux have an IP forwarding and routing infrastructure, and routing demons keep track of adding/removing routes from the routing table.

The critical and latency sensitive task is the forwarding, which is called a data path. Once the routes have been established, the packets need to be forwarded to appropriate interfaces using these routes. When the packet ingresses into the system, it is handed to the software-driven IP forwarding stack. The IP forwarding stack looks up the routes and forwards the packet accordingly. These tasks are typically performed in hundreds of clock cycles. There is inherent latency involved in fetching each instructions and related data in software. The data rate is significantly lower when number of packets/second increases.

Alternatively, routing tasks can be performed by dedicated hardware devices like network processors, enabled with a narrowly focused microcode, to forward the packets. However, this approach means that there are two different processors in the system. The control plane central processing unit (CPU) controls the routes and is enabled by a Linux-like OS to implement all the control plane functionalities. The second, network processor, just manages the run-to-completion forwarding threads. It increases the system cost significantly to have two separate processors. Apart from that, it is also very difficult to program network processors as they have their own microcode architecture and don't run with C like high level language code. It is also not easy to synchronize control plane routing tables with data path forwarding, as they are two separate entities.

It would be advantageous if packet routing could be implemented to rely less upon the control plane microprocessor, without the use of an additional microprocessor to control the forwarding threads.

SUMMARY OF THE INVENTION

Disclosed herein are a system and method for using relatively simple packet forwarding offload engines such as a queue manager, packet classifier, and AVL search tree to aid in packet forwarding.

Accordingly, in a system-on-chip (SoC), a method is provided for forwarding packets. The method begins with an Ethernet media access control (MAC) receiver accepting a packet via a network interface. Using a control plane state machine, a packet header is examined, routing information is derived, and memory allocation is managed. The control plane state machine generates a first message associated with the packet including a memory allocation for storing the packet, and loads the packet into the memory allocation in response to the first message. The control plane state machine supplies a second message associated with the packet, including the routing information and the memory allocation. An operating system (OS) reads the second message, and reads the packet from the memory allocation. The OS modifies the packet header using the routing information received in the second message, and writes the modified packet back into the memory allocation. The control plane state machine reads the modified packet from the memory allocation and delivers the modified packet to an Ethernet MAC transmitter having a network interface.

In one aspect, the control plane state machine derives routing information and manages memory allocation using a Patricia trie state machine examining a packet header to derive a search string. An AVL tree state machine examines the search string to derive a pointer value. The pointer value is used to access entries in a result database to identify routing information, a buffer pool ID associated with a set of locations in memory, and a queue ID. A queue manager (QM) state machine enqueues the first message, includes a memory allocation in the buffer pool ID, and a direct memory access (DMA) engine writes the packet into the memory allocation in response to the first message. The QM prepares the second message including the routing information, the memory allocation in the buffer pool ID, and the queue ID. Finally, the DMA engine reads the modified packet from the memory allocation and delivers the modified packet to an Ethernet MAC transmitter associated with the queue ID.

Additional details of the above-described method and an SoC with a SoC packet forwarding system are presented below.

BRIEF DESCRIPTION OF THE DRAWINGS

FIG. 1B is a schematic block diagram depicting an exemplary embodiment in greater detail.

FIG. 2 is a diagram depicting a simplified version of the Patricia trie of FIG. 1B.

FIG. 3 is a diagram depicting an exemplary IPv4 packet.

FIG. 4 is an exemplary Patricia trie node configuration.

FIG. 5 is an exemplary AVL tree node configuration.

FIG. 6 is an exemplary result database.

FIGS. 7A and 7B are flowcharts illustrating a method for forwarding packets in a SoC.

FIG. 8 is a diagram depicting multiple comparisons being made at a single location in Parser RAM.

DETAILED DESCRIPTION

Figure 1A:
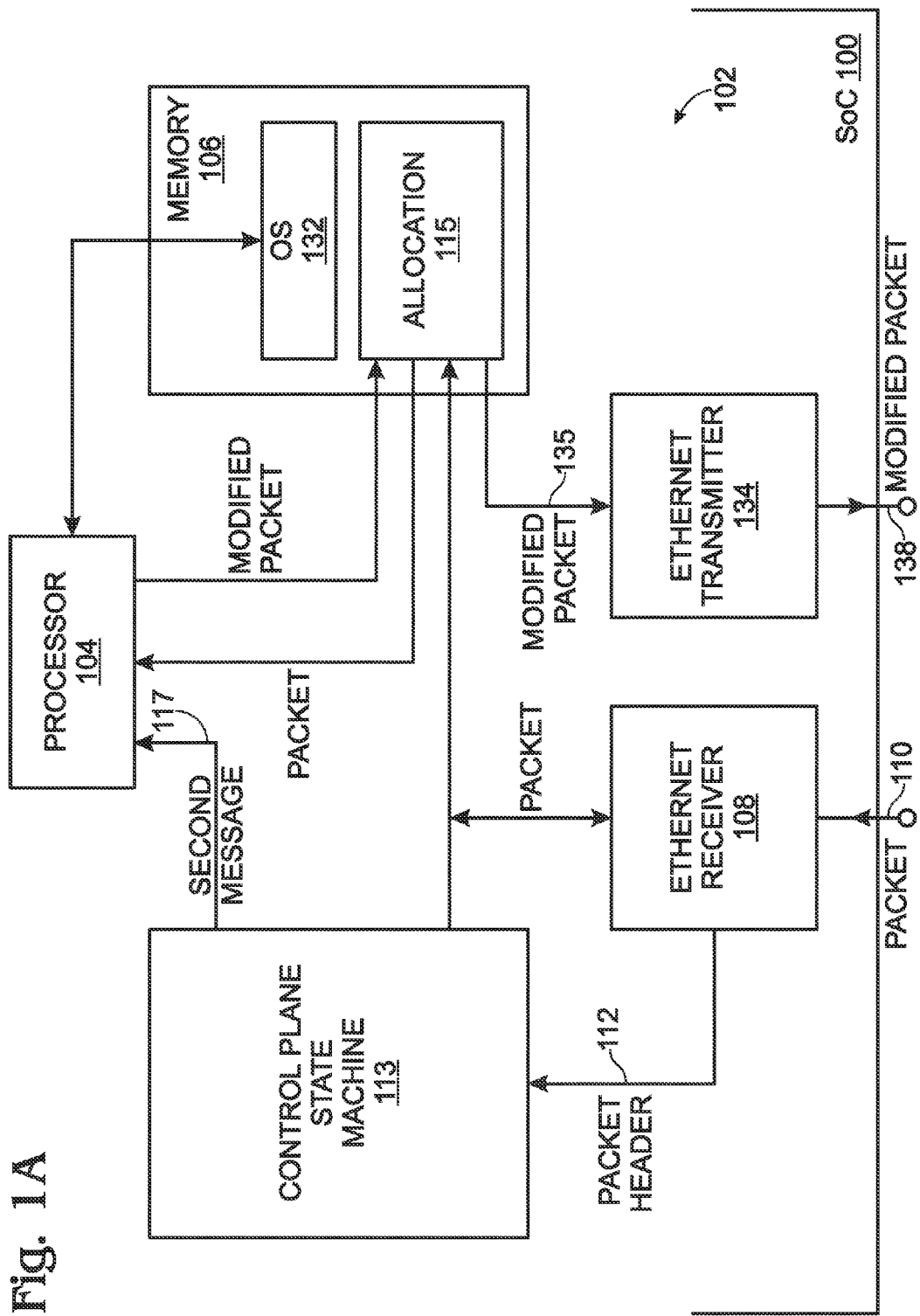
FIG. 1A is a schematic block diagram of a system-on-chip (SoC) packet forwarding system.

FIG. 1A is a schematic block diagram of a system-on-chip (SoC) 100 with a packet forwarding system. The system 102 comprises a processor 104 and a system memory 106. Here, the system memory 106 is shown as part of the SoC 100, but alternatively it may be external to the SoC. An Ethernet media access control (MAC) receiver 108 has a network interface on line 110 to receive a packet and an output on line 112 to supply a header associated with the packet.

A control plane state machine 113 examines the packet header, derives routing information, and manages memory allocation. The control plane state machine 113 generates a first message (see FIG. 1B) associated with the packet including a memory allocation 115 for storing the packet, and loads the packet into the memory allocation in response to the first message. The control plane state machine 113 supplies a second message associated with the packet on line 117, including the routing information and the memory allocation. An operating system (OS) 132, enabled as a sequence of instructions stored in the system memory 106 and executed by the processor 104, reads the second message, reads the packet from the memory allocation 115, modifies the packet header using the routing information received in the second message, and writes the modified packet back into the memory allocation 115. An Ethernet MAC transmitter 134 has an interface on line 136 to accept the modified packet from the memory allocation in system memory 106, and a network interface on line 138 to supply the modified packet.

FIG. 1B is a schematic block diagram depicting an exemplary embodiment in greater detail. In one aspect, the control plane state machine 113 includes a Patricia trie state machine 114 with an input on line 112 to accept the packet header and an output on line 119 to supply a search string. A hardware-enabled AVL tree state machine 116 has an input on line 119 to accept the search string and an output of line 118 to supply a pointer value derived from examining the search string. A result database 124 stored in a local memory 122 cross-references the pointer value to routing information, a buffer pool ID associated with a set of locations in system memory 106, and a queue ID. As used herein, a state machine is a device that accepts an input and uses combinational logic (e.g., AND, NAND, and XOR logic) to compare the input, or values derived from the input, to values stored in registers or local RAM, to yield a result. All the operations performed in a state machine are performed without the use of a processor or software code executed by a processor. In one aspect, the register values are programmable.

A queue manager (QM) state machine 125 manages a processing queue 126 and a destination queue 128. Here, the destination queue 128 is enabled as a plurality of parallel queues 128-0 through 128-n. However, in other aspects of the system, a single queue may also be used. The QM 125 enqueues the first message in the destination queue 128-0. The first message includes a memory allocation in the buffer pool ID. The QM 125 enqueues the second message in the processing queue 126. The second message includes the routing information, the memory allocation in the buffer pool ID, and the queue ID. The QM state machine 125 may be enabled with combination logic to aid in decision making and buffer memory to enable the queues.

A direct memory access (DMA) engine 130-0 writes the packet into the memory allocation 115 in system memory 106 in response to the first message. An Ethernet MAC transmitter 134-0, associated with the queue ID, has an interface on line 136-0 to accept the modified packet delivered by the DMA engine 130-0 from the memory allocation 115 in system memory 106. The Ethernet MAC transmitter 134-0 has a network interface on line 138-0 to supply the modified packet.

The system 102 further comprises a receiver first-in first-out (FIFO) buffer 140 associated with the Ethernet receiver 108 and a transmit FIFO buffer 142-0 associated with the Ethernet transmitter 134-0. The Ethernet receiver 108 writes the accepted packet into the receiver FIFO buffer 140. The Ethernet MAC transmitter 134-0 dequeues the first message from the destination queue 128-f) and orders the DMA engine 130-0 to read the packet from the receiver FIFO buffer 140, and write the packet into the memory allocation 115 in system memory 106. More explicitly, the QM state machine 125 acts on behalf of the Ethernet MAC transmitter 134-0 to dequeue the first message and order the DMA engine 130-0 to read the packet from the receiver FIFO buffer 140.

The OS 132 updates the packet header with a new media access control (MAC) (L2) header, replaces the MAC destination address in the header, updates a MAC source address with a MAC address associated with an interface ID in the second message, and sends a message to the Ethernet transmitter 134-0 indicating that the packet has been modified. More explicitly, the OS 132 sends a completion message to the completion queue 120.

Subsequent to the processor 104 notifying the Ethernet MAC transmitter 134-0 that the packet has been modified, the Ethernet MAC transmitter 134-0 orders the DMA engine 130-0 to read the modified packet from the location in system memory 106, and write the modified packet into the transmit FIFO buffer 142-0. More explicitly, the completion message is dequeued from the completion queue 120, and the DMA engine 130-0 reads the modified packet in response to the dequeued completion message.

As shown, the system 102 may further comprise a plurality of n DMA engines 130-0 through 130-n and a plurality of n Ethernet transmitters (134-0 through 134-n), where each Ethernet transmitter is associated with a corresponding DMA engine and queue ID. The QM 124 supplies the first message with a first queue ID selected from the plurality of n queue IDs. A first Ethernet MAC transmitter associated with the first queue ID (e.g., 134-0) reads the first message, and orders a corresponding first DMA engine (e.g., 130-0) to read the packet from the receiver FIFO buffer 140.

FIG. 2 is a diagram depicting a simplified version of the Patricia trie, of FIG. 1B. The Patricia trie state machine 114 has a first node 200 for comparing a MAC destination address bytes from the packet header to a reference address, and a second node 202 for comparing packet type bytes from the packet header to a reference type value. A third node 204 compares a version type byte from the packet header to a reference version value, and a fourth node 206 compares a time to live (TTL) byte from the packet header to a minimum TTL value. In response to successful node comparisons in the Patricia trie, the AVL module uses a source Internet Protocol (IP) address and destination IP address bytes from the packet as a search string to walk a tree of addresses, and if a hit is found in an AVL tree of addresses, it supplies the pointer value associated with a matching node.

In one aspect, each node in the Patricia trie, 114 is a 2-byte node, so that the Patricia trie compares the MAC destination to a series of sub-nodes under the first node 200 as follows. A first sub-node 200a compares a first set of two bytes of the MAC destination address to a two-byte first reference address portion. In response to a match, a second sub-node 200b compares a second set of two bytes of the MAC destination address to a two-byte second reference address portion. In response to a match, a third sub-node 200c compares a third set of two bytes of the MAC destination address to a two-byte third reference address portion.

In another aspect, the Patricia trie 114 reads 2 bytes of the packet header beginning at byte number 13, and compares it to a reference value type representing an IPv4 packet type at the second node 202. Further, the Patricia trie 114 reads byte number 15 from the packet header, and compares it to a reference version value representing an 0x4 version at the third node 204. The AVL module locates the source IP address and destination IP address bytes by reading 8 bytes from the packet header, beginning at byte number 27.

Returning to FIG. 1B, in one aspect the packet forwarding software application 132 maintains an OS kernel routing table 144 in the system memory 106, and the AVL tree state machine 116 synchronizes the tree of addresses with the OS kernel routing table.

FIG. 3 is a diagram depicting an exemplary IPv4 packet. Note: a 14-byte L2 (Ethernet) header precedes the IPv4 header part of the packet.

Functional Description

The system described in FIG. 1A improves IPv4 packet forwarding data rate significantly using hardware offload engines in the SoC, such as the queue manager, packet classifier (Patricia trie), and AVL search tree. The system offloads the forwarding data tasks to offload engines, while the routing continues to be performed by a packet forwarding Ethernet driver software, such as a Linux-like OS. The routing infrastructure remains supported, with very low level of routing API being modified. These changes are transparent to the control plane and routing demons like BGP, OSPF, and route utility.

As mentioned before, there are three major tasks done in complete IPv4 forwarding data path. Here are the details of each of them:

Input processing: In this task, memory is allocated for the packet and the packet is received in the system. Then the packet is examined for its validity. If the packet is not valid, it is dropped, packet memory is freed, and statistics are updated.

Forwarding: In this task, the packet's header is used for lookup into the routing table. If the packet is sinking (terminating in the system), it is simply delivered to higher level for further packet processing. But if the packet is not sinking in the system, then the routing table is used for lookup. If the valid route is found, the packet is prepared for output processing with the appropriate interface information. If the route is not found, the packet is dropped, packet memory is freed, and an Internet Control Message Protocol (ICMP) route not found packet is sent to the source.

Output processing: In this task, some packet modifications are done. For example, appropriate MAC addresses in L2 header are modified. In the case of IPv4, the header is modified by computing a new time to live (TTL). Then, the packet is sent out on appropriate interface. After the packet is sent out of the physical interface, packet memory is de-allocated.

A majority of the above-mentioned functionalities have been offloaded to hardware devices. For example, a packet classifier device is configured as Patricia trie nodes for packet validation. In one aspect, the Patricia tree is initially configured using software to load particular node values, once configuration is complete, the Patricia trie operates as a hardware device without the aid of a microprocessor.

In the Patricia trie or parser stage a hardware block starts by reading a certain preconfigured location in an incoming data stream and then compares the contents of the selected bytes with the contents in a preprogrammed Parser RAM. The next action to be taken is determined by the result of the comparison. Usually two actions are specified—an action to be taken if the bytes match, and an action to be taken if they do not. The types of comparisons that can be made are: Equal To, Greater Than or Equal To, Less Than or Equal To, AND with Mask, OR with Mask, Invert Compare, etc. The types of actions that can be taken are: Select the next bytes in the packet to compare, select the next location in the preprogrammed RAM (results database) to compare the packet bytes to, extract a portion of the bytes as part of a search string, extract and store the bytes for use in a future search, extract the bytes and add them to other extracted bytes and then store the results for a future search, and indicate the current bytes are the last ones that need to be extracted or compared, etc. Since the extracted bytes are compared to a preprogrammed Parser RAM location, the RAM location can be reprogrammed with a new set of comparisons and actions if the rules for parsing the incoming stream are changed. Furthermore, the reprogramming can be done in a manner in which a string that is in the midst of being parsed is not interrupted. This allows the rules to be updated without affecting the flow of incoming packets.

FIG. 8 is a diagram depicting multiple comparisons being made at a single location in Parser RAM. The preprogrammed Parser RAM contents are arranged in order to minimize the number of comparisons needed to search for a string. For example, multiple comparisons can be made to the incoming data string by using a wide Parser RAM and having the comparisons made sequentially from left to right. In this implementation, all but the last comparison specify what the match action is. Whenever a match is found, the action corresponding to that comparison is taken and no further comparisons are made at that location. If additional comparisons of the same incoming data bytes are necessary, a no match action can specify that the no match action is to jump to a new Parser RAM address.

The second part of the design consists of the search stage. This stage takes the search strings assembled as the result of the parser stage and sends the strings to the exact match search engine and the AVL search engine. The exact match search engine uses an AVL search tree in order to perform a search that is bounded in terms of the number of accesses needed to make the search in O(log 2n) accesses, where n is the maximum number of entries stored in the search engine table. AVL trees have the advantage of fast add and delete times. However, an AVL tree has a disadvantage because the number of accesses in the worst case can be more than a tree that is binary sorted.

FIG. 4 is an exemplary Patricia trie node configuration. The Patricia tree and key nodes may be configured as follows Node index 0 is configured as eight-way decision node. An eight-way decision node can have up to eight rules/branches to configure, each branch can compare 2 bytes.

Node 0/Branch 0 is configured with first 2 bytes of the DA address to compare with first two bytes of packet (bytes 1 and 2). If they are equal, then jump to node 0/branch 1, else send it to CPU for normal processing.

Node 0/Branch 1 is configured with second 2 bytes of the DA address to compare with second two bytes of packet (bytes 3 and 4). If they are equal, then jump to node 0/branch 2, else send it to CPU for normal processing.

Node 0/Branch 2 is configured with third 2 bytes of the DA address to compare with third two bytes of packet (bytes 5 and 6). If they are equal, then jump to node 0/branch 3, else send it to CPU for normal processing.

Node 0/Branch 3 is configured to compare 2 bytes from 13th byte of the packet with value 0x0800 (Eth type is IPv4 or not). If equal, then jump to node 0/branch 4, else send it to CPU for normal processing Node 0/Branch 4 is configured to compare byte number 15th of the packet with value 0x45. If equal, then jump to node 0/branch 5, else send it to CPU for normal processing.

Node 0/Branch 5 is configured to compare byte number 23 of the packet. If greater than 1, then jump to node 1/branch 0.

Node index 1 is configured as dual four-way decision node (dual four-way decision nodes can have up to two sets of four rules/branches to configure, each branch can compare 2 bytes). The way 0 is configured with all four branches and way 1 is configured with only one branch.

Node 1/Way 0/Branch 0 is configured to extract the first 2 bytes of the SRC (source) IP address from the packet to later look up in the AVL tree and jump to node 1/way 0/branch 1.

Node 1/Way 0/Branch 1 is configured to extract the second 2 bytes of SRC IP address from the packet to later look up in the AVL tree and jump to node 1/way 0/branch 2.

Node 1/Way 0/Branch 2 is configured to extract the first 2 bytes of the DST IP address from the packet to later look up in the AVL tree and jump to node 1/way 0/branch 3.

Node 1/Way 0/Branch 3 is configured to extract the second 2 bytes of the DST IP address from the packet to later look up in the AVL tree and jump to node 1/way 1/branch 0.

Node 1/Way 1/Branch 0 is configured as a last node and jump to key node index 0 from here.

Node index 2 is configured as one key node (key node index 0).

The key node index 0 contains the result database pointer.

FIG. 5 is an exemplary AVL tree node configuration. There are two different tasks performed by the AVL tree, they are: AVL tree search string look up, and AVL tree search hit result pointer.

AVL tree search string look up: The AVL tree search string look up entries are synchronized with the packet forwarding software kernel routing table. It is kept up to date by configuring the required routes from the kernel routing table. Whenever routes are added to the kernel routing table, the same route entry is added in AVL tree. The AVL search entries contain the following information:

Source IP address

Destination IP address

Search hit result pointer

The source IP address and destination IP address form an 8-byte AVL search string. These entries are in sync with the routing table. AVL tree search result database: The AVL tree search hit result pointer points to the result database entry. In this example, if the source IP address extracted from the packet is 192.168.10.101 and the destination IP address extracted from packet is 172.125.13.200, then the node index 1 will be hit in the AVL tree look up and it will use result database pointer index 2 to extract result database information.

The result database entry contains following information:

The signature, which indicates that the packet was hit in the AVL search tree;

The QM work queue (queue ID) associated with the packet;

The buffer pool ID needed to DMA the packet into memory;

The interface ID to forward the packet;

The destination MAC address used to send this packet on given interface.

The signature, interface ID and destination MAC address are sent to CPU in the QM (processing) message (H0 info and H1 info).

FIG. 6 is an exemplary result database. Continuing the example form FIG. 5, if the results database index 2 was hit in the AVL tree look up, the pointer 2 from the table is used. It will have signature 0xCC, the destination port index 0 to forward this packet, and destination MAC address 00:23:45:15:16:10 to be used as an outgoing packet's DA MAC address.

The destination MAC address in the result database entry is synchronized with the kernel Address Resolution Protocol (ARP) table. If the AVL tree has a match, then it is a route look up hit, and the following is the sequence used to process the packet.

The following steps are performed by hardware:

Look up in the indexed result database as per the hit entry;
Extract result database information;
Allocate buffer for the given queue ID;
DMA the packet to the allocated buffer;
Prepare a (destination) message with signature, interface ID, and destination MAC address;
Enqueue the message into the given work queue.

The following steps are performed by software:

The QM driver gives the message to Ethernet driver;
The Ethernet driver (packet forwarding software) verifies the signature in message and understands that there is routing look up hit for this packet and that the packet is to be forwarded;
The Ethernet driver extracts the destination MAC address and outgoing interface ID (DST port) from the QM message;
The Ethernet driver updates the packet header with new L2 header;
The Ethernet driver updates the destination MAC address with the extracted destination MAC from the QM message;
The Ethernet driver updates the source MAC address with the MAC address of the outgoing interface extracted from the QM message;
The Ethernet driver decrements the TTL of IP header. The Ethernet driver doesn't need to check for valid TTL, as it is already done by Patricia tree;
The Ethernet driver sends a message to the outgoing interface (Ethernet transmitter).

The following steps are performed by hardware:

The Ethernet transmitter receives the message sent by software (Ethernet driver);
The Ethernet transmitter sends the packet out to the network interface;
The Ethernet transmitter de-allocates the buffer.

If the AVL tree has no match, then the default result is used and the packet is sent to CPU without any context information. The Ethernet driver will look and find no context information. It will simply give the packet to software IP stack, and the software processes the packet conventionally.

In summary, the control plane state machine not only update its own routing table in system memory, but also updates routes in Patricia trie and AVL tree, and keeps them synchronized with system memory software based routine table. Control plane memory management functions are off-loaded to the QM hardware, which manages the free buffer. Allocation and de-allocation automatically occurs in hardware. Further, the OS looks into the (second) message it receives from the control plane, permitting it to bypasses a lot of packet processing in software, as the OS is able to rely upon information given in the message to route the packet.

In benchmark tests comparing the above-described system to a device using a software based control and data planes, the software system sees 24% of traffic received back from system for 64-byte packet size IP packet forwarding from Ethernet port 0 to Ethernet port 1. In contrast, the above-described system sees 80% of traffic received back from the system for 64-byte packet size IP packet forwarding from Ethernet port 0 to Ethernet port 1.

Figure 7A:
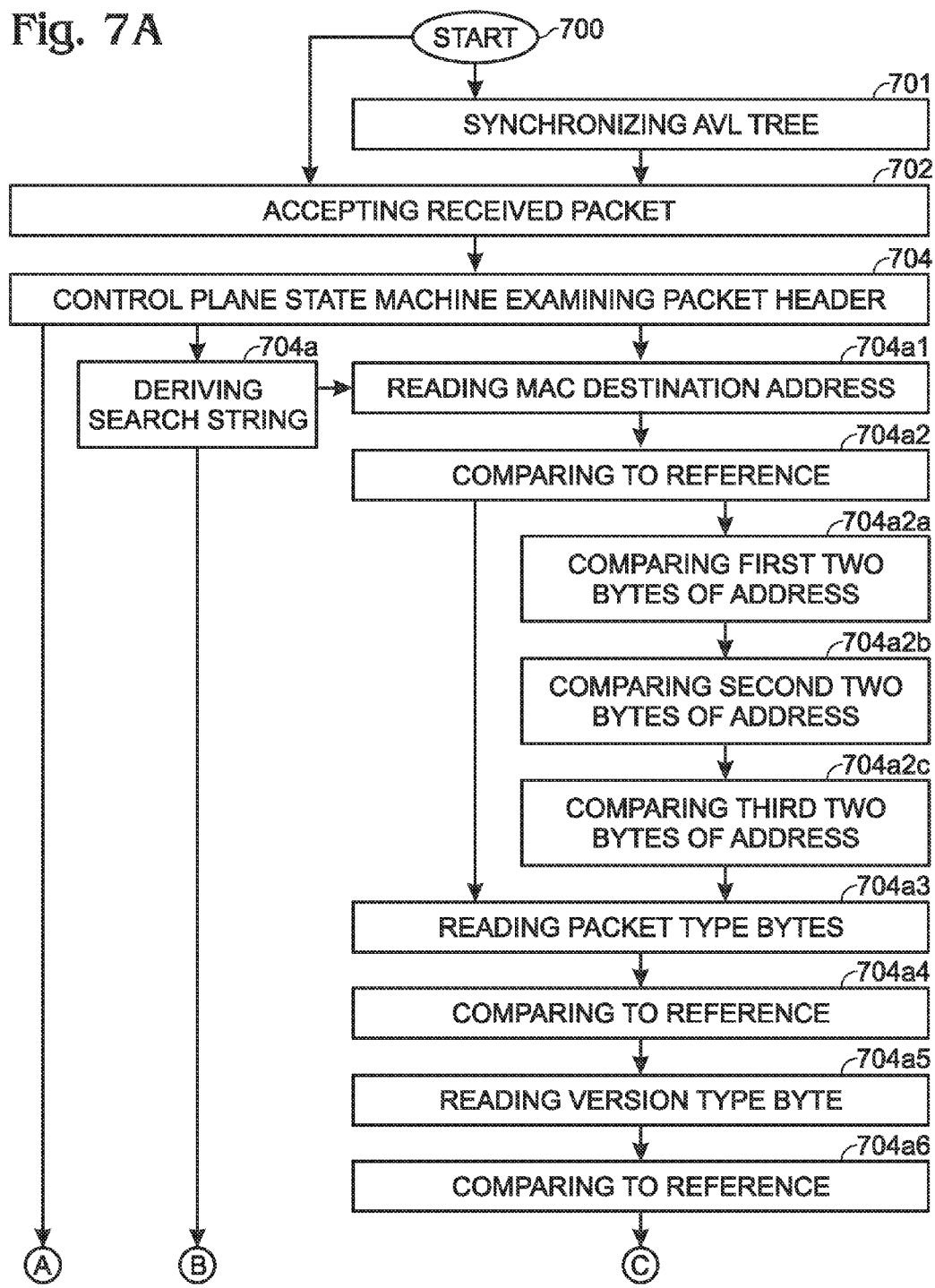

FIGS. 7A and 7B are flowcharts illustrating a method for forwarding packets in a SoC. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 700.

Step 701 synchronizes an AVL tree of addresses in an AVL state machine with an operating system (OS) kernel routing table. In Step 702 an Ethernet MAC receiver accepts a packet via a network interface. In Step 704 a control plane state machine examines a packet header, derives routing information, and manages memory allocation. The control plane state machine generates a first message associated with the packet including a memory allocation for storing the packet, and loads the packet into the memory allocation in response to the first message. The control plane state machine supplies a second message associated with the packet, including the routing information and the memory allocation. In Step 706 an operating system (OS), enabled as a sequence of instructions stored in a tangible memory and executed by a processor, reads the second message, and reads the packet from the memory allocation. The OS modifies the packet header using the routing information received in the second message, and writes the modified packet back into the memory allocation. In Step 708 the control plane state machine reads the modified packet from the memory allocation and delivers the modified packet to an Ethernet MAC transmitter having a network interface.

In one aspect, Step 704 includes substeps. In Step 704a a Patricia trie, state machine examines addresses in a header of the packet to derive a search string. Step 704b using an AVL tree state machine examines the search string to derive a pointer value. Step 704c uses the pointer value to access entries in a result database to identify routing information, a buffer pool ID associated with a location in memory, and a queue ID. In Step 704d a queue manager (QM) state machine enqueues a first message. The first message includes the buffer pool ID. In Step 704e a direct memory access (DMA) engine writes the packet into the memory location in response to the first message. In Step 704f the QM prepares the second message. The second message includes the routing information, the buffer pool ID, and the queue ID. In Step 708 the DMA engine reads the modified packet from the memory location and delivers the modified packet to an Ethernet transmitter associated with the queue ID.

In one aspect, Step 704a includes substeps. Step 704a1 reads media access control (MAC) destination address bytes from the packet header. At a first node, Step 704a2 compares the MAC destination address bytes to a reference address. If the MAC destination address bytes match the reference address, Step 704a3 reads packet type bytes from the packet. At a second node, Step 704a4 compares the packet type bytes to a reference type value. If the packet type bytes match the reference type value, Step 704a5 reads a version type byte from the packet. At a third node, Step 704a6 compares the version type byte to a reference version value. If the version type byte matches the reference version value. Step 704a7 reads a time to live (TTL) byte from the packet. At a fourth node, Step 704a8 compares the TTL byte to a minimum TTL value. If the TTL byte is greater than the minimum TTL value, Step 704a9 reads source Internet Protocol (IP) address and destination IP address bytes from the packet. Step 704b1, using the source IP address and destination IP address bytes as a search string, walks an AVL tree of addresses. If a hit is found in the AVL tree of addresses. Step 704b2 reads the pointer value associated with a matching node in the tree.

In one aspect, Step 704a includes each node in the Patricia trie being a 2-byte node. Then, comparing the MAC destination address bytes to the reference address at the first node in Step 704a2 includes comparing the MAC destination in a series of substeps as follows. At a first sub-node Step 704a2a compares a first set of two bytes of the MAC destination address to a two-byte first reference address portion. In response to a match, at a second sub-node Step 704a2b compares a second set of two bytes of the MAC destination address to a two-byte second reference address portion. In response to a match, at a third sub-node Step 704a2c compares a third set of two bytes of the MAC destination address to a two-byte third reference address portion.

In another aspect, reading the packet type bytes in Step 704a3 includes reading 2 bytes of the packet header beginning at byte number 13. Then, comparing the packet type bytes to a reference type value in Step 704a4 includes comparing to a reference value type representing an IPv4 packet type.

In one aspect, reading the version type byte in Step 704a5 includes reading byte number 15 from the packet header. Then, comparing the version type byte to a reference version value in Step 704a6 includes comparing to a reference version value representing an 0x4 version. In another aspect, using the source IP address and destination IP address bytes as a search string in Step 704b1 includes reading 8 bytes from the packet header, beginning at byte number 27.

In one aspect, the DMA engine writing the packet into the memory location (Step 704e) includes substeps. In Step 704e1 an Ethernet MAC transmitter associated with the queue ID dequeues the first message. In Step 704e2 a DMA engine associated with the Ethernet MAC transmitter reads the packet from an Ethernet receiver buffer, and writes the packet into the memory allocation.

In another aspect, using the pointer value to access the queue ID in Step 704c includes accessing a first queue ID selected from a plurality of n queue IDs. In Step 704e a first DMA engine, selected from a plurality of n DMA engines, writes the packet. Each DMA engine is associated with a corresponding queue ID. Then, in Step 708 the first DMA engine delivers the modified packet to a first Ethernet MAC transmitter, selected from a plurality of n Ethernet MAC transmitters, where each Ethernet MAC transmitter is associated with a corresponding DMA engine.

A system and method have been provided for routing packets using hardware enabled components such as a Patricia trie, AVL tree, and QM. Examples of particular message structures and hardware units have been presented to illustrate the invention. However, the invention is not limited to merely these examples. Other variations and embodiments of the invention will occur to those skilled in the art.

We claim:

1. In a system-on-chip (SoC), a method for forwarding packets, the method comprising:
    examining a packet header of a packet to derive a search string via a Patricia trie, and determining a pointer value based on the search string via an AVL tree;
    determining routing information and a memory allocation address information based on accessing a results database with the pointer value, the memory allocation address information comprises a buffer pool ID associated with a set of locations in memory and a queue ID;
    generating a first message that comprises the memory allocation address information for storing the packet, and loading the packet into a memory based on the memory allocation address information;
    generating a second message that comprises the routing information and the memory allocation address information for the packet;
    reading, by a processor, the second message, retrieving the packet from the memory based on the second message, modifying the packet header based on the routing information in the second message, and writing the modified packet back into the memory; and
    delivering the modified packet to an Ethernet media access control (MAC) transmitter having a network interface.

2. The method of claim 1, further comprising:
    enqueuing the first message including the buffer pool ID;
    writing the packet into the memory at a memory address identified by the memory allocation address information;
    wherein generating the second message further comprises generating the second packet based on the routing information, the memory allocation in the buffer pool ID, and the queue ID; and,
    reading the modified packet from the memory allocation and delivering the modified packet to the Ethernet MAC transmitter that is associated with the queue ID.

3. The method of claim 2,
    wherein deriving the search string via the Patricia trie further comprises:
    reading media access control (MAC) destination address bytes from the packet header;
    comparing the MAC destination address bytes to a reference address at a first node;
    if the MAC destination address bytes match the reference address, reading packet type bytes from the packet;
    comparing the packet type bytes to a reference type value at a second node;
    if the packet type bytes match the reference type value, reading a version type byte from the packet;
    comparing the version type byte to a reference version value at a third node;
    if the version type byte matches the reference version value, reading a time to live (TTL) byte from the packet;
    comparing the TTL byte to a minimum TTL value at a fourth node;

if the TTL byte is greater than the minimum TTL value, reading source Internet Protocol (IP) address and destination IP address bytes from the packet; and wherein determining the pointer value based on the search string via the AVL tree further comprises:

using the source IP address and destination IP address bytes as a search string, walking an AVL tree of addresses; and, if a hit is found in the AVL tree of addresses, reading the pointer value associated with a matching node in the tree.

4. The method of claim 3 wherein comparing the MAC destination address bytes to the reference address at the first node further comprises comparing the MAC destination address bytes to a series of sub-nodes as follows:

comparing a first set of two bytes of the MAC destination address bytes to a two-byte first reference address portion at a first sub node;

in response to a match, comparing a second set of two bytes of the MAC destination address bytes to a two-byte second reference address portion at a second sub node; and, in response to a match, comparing a third set of two bytes of the MAC destination address bytes to a two-byte third reference address portion at a third sub-node.

5. The method of claim 3, wherein reading the packet type bytes comprises reading 2 bytes of the packet header beginning at a thirteenth byte of the packet header; and, wherein comparing the packet type bytes to the reference type value comprises comparing to the reference value type representing an IPv4 packet type.

6. The method of claim 5 wherein reading the version type byte comprises reading byte number 15 from the packet header; and, wherein comparing the version type byte to a reference version value comprises comparing to a reference version value representing an 0x4 version.

7. The method of claim 6 wherein using the source IP address and destination IP address bytes as a search string comprises reading 8 bytes from the packet header, beginning at byte number 27.

8. The method of claim 2 further comprising:

the control plane state machine synchronizing the AVL tree state machine tree of addresses with an operating system (OS) kernel routing table.

9. The method of claim 2 wherein DMA engine writing the packet into the memory allocation further comprises:

dequeuing the first message; and, reading the packet from an Ethernet receiver buffer, and writing the packet into the memory allocation.

10. The method of claim 2 wherein using the pointer value to access the queue ID comprises accessing a first queue ID selected from a plurality of n queue IDs;

wherein reading the modified packet from the memory allocation comprises delivering the modified packet to a first Ethernet MAC transmitter, selected from a plurality of n Ethernet MAC transmitters, where each Ethernet MAC transmitter is associated with a corresponding DMA engine.

11. The method of claim 1 wherein modifying the packet header using the routing information comprises updating an L2 MAC header header, replacing a MAC destination address, replacing a MAC source address associated with an interface ID, and sending a message to the Ethernet MAC transmitter indicating that the packet has been modified.

12. In a system-on-chip (SoC), a packet forwarding system, the system comprising:

a processor;

a system memory;

an Ethernet media access control (MAC) receiver having a network interface to receive a packet and an output to supply a packet header associated with the packet;

a Patricia trie state machine configured for outputting a search string based on the packet header;

an AVL tree state machine configured for determining a pointer value based on the search string;

a control plane state machine configured for determining routing information and a memory allocation address information based on correlating a results database with the pointer value, the memory allocation address information comprises a buffer pool ID associated with a set of locations in memory and a queue ID, and the control plane state machine is further configured for generating a first message associated with the packet that comprises a memory allocation address information for storing the packet, and loading the packet into the system memory based on the memory allocation address information, and generating second message associated with the packet, that comprises the routing information and the memory allocation address information for the packet;

an operating system (OS), enabled as a sequence of instructions stored in the system memory and executed by the processor, that is configured for reading the second message, retrieving the packet from the system memory based on the second message, modifying the packet header based on the routing information in the second message, and writing the modified packet back into the system memory; and, an Ethernet MAC transmitter that has an interface to accept the modified packet from the system memory, and a network interface to transmit the modified packet.

13. The system of claim 12 wherein the control plane state machine comprises:

a queue manager (QM) configured for enqueuing the first message in the destination queue, wherein the first message comprises the buffer pool ID, and the QM is further configured for enqueuing a second message associated with the packet in the processing queue, wherein the second message comprises the routing information, the buffer pool ID, and the queue ID;

a direct memory access (DMA) engine writing the packet into the system memory based on the first message; and, wherein the Ethernet MAC transmitter is an Ethernet MAC transmitter associated with the queue ID.

14. The system of claim 12 the Patricia trie state machine has a first node configured for matching a set of MAC destination address bytes from the packet header to a reference address, a second configured node for matching a set of packet type bytes from the packet header to a reference type value, a third node configured for matching a version type byte from the packet header to a reference version value, a fourth node configured for matching a time to live (TTL) byte from the packet header to a minimum TTL value; and, wherein the AVL tree state machine, in response to successful node matches in the Patricia tree, uses a source Internet Protocol (IP) address and the set of destination IP address bytes from the packet as a search string to walk a tree of addresses, and if a hit is found in the tree of addresses, the AVL tree state machine is configured for generating the pointer value associated with a matching node.

15. The system of claim 14 wherein each node in the Patricia trie state machine is a 2-byte node, and wherein the Patricia trie state machine is further configured for matching the MAC destination address bytes to a series of sub-nodes under the first node as follows:
  a first sub-node configured for matching a first set of two bytes of the MAC destination address to a two-byte first reference address portion;
  in response to a match, a second sub-node configured for matching a second set of two bytes of the MAC destination address bytes to a two-byte second reference address portion; and,
  in response to a match, a third sub-node configured for matching a third set of two bytes of the MAC destination address bytes to a two-byte third reference address portion.

16. The system of claim 15 wherein the Patricia trie state machine is configured for reading 2 bytes of the packet header beginning at byte number 13, and compares it to a reference value type representing an IPv4 packet type at the second node.

17. The system of claim 16 wherein the Patricia trie state machine is configured for reading byte number 15 from the packet header, and is further configured for matching it to a reference version value representing an 0x4 version at the third node.

18. The system of claim 17 wherein the AVL tree state machine is configured for locating the source IP address and destination IP address bytes by reading 8 bytes from the packet header, beginning at byte number 27.

19. The system of claim 14 wherein the OS is configured for maintaining an OS kernel routing table in the system memory; and,
  wherein the AVL tree state machine is configured for synchronizing the tree of addresses with the OS kernel routing table.

20. The system of claim 12 wherein the OS is configured for updating the packet header with a new MAC (L2) header, and is further configured for replacing replaces the MAC destination address in the packet header, updating a MAC source address with a MAC address associated with an interface ID in the second message, and sending a message to the Ethernet MAC transmitter indicating that the packet has been modified.

21. The system of claim 12 further comprising:
  a receiver first-in first-out (FIFO) buffer associated with the Ethernet MAC receiver;
  a transmit FIFO buffer associated with the Ethernet MAC transmitter;
  wherein the Ethernet MAC receiver is configured for writing the accepted packet into the receiver FIFO buffer;
  the Ethernet MAC transmitter is configured for degeueing the first message from the destination queue and ordering the DMA engine to read the packet from the receiver FIFO buffer, and write the packet into the memory allocation in the system memory; and,
  the Ethernet MAC transmitter, subsequent to the packet being modified, is configured for ordering the DMA engine to read the modified packet from the memory allocation in system memory, and write the modified packet into the transmit FIFO buffer.

22. The system of claim 21 further comprising:
  a plurality of DMA engines;
  a plurality of Ethernet MAC transmitters, each Ethernet MAC transmitter associated with a corresponding DMA engine and a queue ID;
  wherein the QM is configured for supplying the first message with a first queue ID selected from a plurality of queue IDs; and,
  a first Ethernet MAC transmitter associated with the first queue ID is configured for reading the first message, and ordering a corresponding first DMA engine to read the packet from the receiver FIFO buffer.

* * * * *